Feb. 6, 1968   A. C. HOFFMAN   3,367,362
FLUID FLOW CONTROL DEVICE
Filed March 15, 1965   2 Sheets-Sheet 1

INVENTOR:
ALLAN C. HOFFMAN
BY
Herzig and Walsh
ATTORNEYS

INVENTOR.
ALLAN C. HOFFMAN
BY
Herzig and Walsh
ATTORNEYS

United States Patent Office 3,367,362
Patented Feb. 6, 1968

3,367,362
FLUID FLOW CONTROL DEVICE
Allan C. Hoffman, 2891 Rumsey Drive,
Riverside, Calif. 92506
Filed Mar. 15, 1965, Ser. No. 439,605
9 Claims. (Cl. 137—517)

ABSTRACT OF THE DISCLOSURE

The invention is a fluid flow control device or valve. It takes the form of a resilient ball of spherical shape cooperating with a seat of spherical configuration of larger diameter. The valve may be mounted in any flow channel, sealed to the side of the channel. The pressure of the moving fluid compresses or deforms the ball while it engages the seat of spherical configuration. The seat has orifice means so that the valve exercises a controlling function as the ball deforms in response to the pressure. In this manner, any of various kinds and types of flow characteristics can be realized.

The flow control device may include additional means of spherical configuration caging the ball and these means may be arranged to exercise a flow controlling function in one direction and a check valve function in the opposite direction.

---

This invention relates to a unique fluid flow control device of extremely simplified construction, but yet being very positive and effective in operation.

Simplified fluid flow control devices have been proposed in the past. One such proposal uses a deformable washer with a hole through the center seating against a chamfered shoulder in a pipe to form a control valve. Upon increasing pressure, the pressure forces the washer against the shoulder tending to squash it and to thereby make smaller the hole through the washer. Such a device is subject to certain deficiencies, one of which is if the pressure gets high enough it will blow the washer through the hole. Also, the recovery from deformation is relatively slow. The design flexibility is limited. Also, such device cannot serve dual purpose of flow control and check valve.

In a preferred form of the present invention an orifice member is provided in combination with a deformable member which is deformed by the fluid pressure in a manner to regulate the area of the orifice or orifices in the orifice member exposed to fluid flow. In the preferred form of the invention the orifice member is made generally hemispherical (or spherical) and the deformable member is made as a spherical rubber ball. When the orifice member is made spherical it forms a cage for the spherical ball. The orifices may be of various shapes. Also, one side or half of the spherical cage may have a single opening or aperture so that the device acts as a check valve for fluid flow in one direction and a regulating or control valve for fluid flow in the opposite direction. In the preferred form of the invention the parts are extremely simple parts that can be very easily and readily installed in a fluid line as will be described in detail hereinafter. The invention is not limited to the hemispherical and spherical configurations referred to.

In the light of the foregoing it is the primary object of the invention to provide a unique fluid flow control device of extremely simplified construction, but yet being very positive and effective in action, while offering the capabilities of easy variation in design with resultant versatility of possible applications and usages.

Another object of the invention is to provide a device as in the foregoing object made of extremely simple, inexpensive and easily fabricated parts which are very easy to install and maintain.

Another object is to provide a device as in the foregoing wherein a deformable ball is arranged to cooperate with either a single orifice member to control fluid flow or plural orifices members to provide different types of control in different flow directions.

Another object is to provide a device as in the previous object wherein the device comprises an orifice member preferably of hemispherical or spherical shape with a deformable control member which is preferably a spherical ball cooperating with the orifice member or members.

Another object is to provide a further form of the device in which a spring is associated with the ball to exert control on the regulating effect of the valve formed by the ball and orifice member or members.

Further objects and additional advantages of the invention will become apparent from the following detailed description and annexed drawings wherein.

Figure 1:
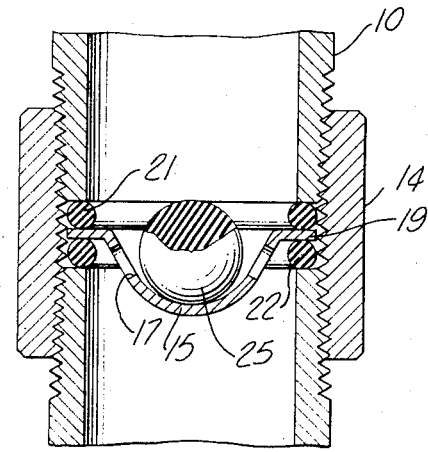
FIGURE 1 is a cross-sectional view of one preferred form of the invention.

Referring now more in detail to the various figures of the drawings, numeral 10 designates the end of a tube or pipe which is threaded at the end. Numeral 11 designates the end part of another tube or pipe threaded at the end. The parts 10 and 11 may be parts of a fitting or coupling. Numeral 14 designates an internally threaded sleeve shown coupling the tube ends 10 and 11 together. The ends of the tubes 10 and 11 are spaced as shown. Numeral 15 designates an orifice member which in the preferred form of the invention is hemispherical having spaced orifices 17 in it, as shown. It has a peripheral flange 19 which is positioned between sealing O-rings 21 and 22, the flange 19 and the O-rings 21 and 22 being positioned between the ends of the tubes 10 and 11 which may be drawn together by the sleeve 14 to compress the O-rings 21 and 22 against the flange 19. The figures illustrate an exemplary manner of sealing the orifice member. It, of course, may be sealed between a male fitting and a female fitting threaded together, using one or more O-rings.

Cooperating with the orifice member 15 is a deformable spherical ball 25 which may be made of rubber or the like. In a preferred form of the invention, ball 25 has a radius slightly less than the radius of curvature of the orifice member 15. Any number of orifices 17 may be provided and these orifices may be circular or may have other shapes, and may be arranged in different patterns to provide a variety of control characteristics. In one exemplary form of the invention the ball has a diameter which is 7/10 the diameter of the orifice member.

Figure 7:
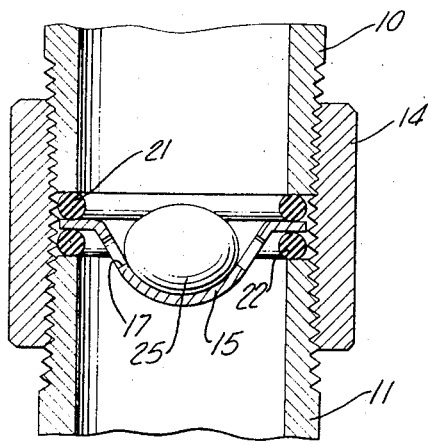
FIGURE 7 is a view similar to that of FIGURE 1 showing the ball deformed by pressure.

In operation, the pressure of fluid passing through the device urges the ball 25 against the orifice member 15 tending to compress the ball and deform it. When the ball 25 deforms or changes its shape, it covers and closes off the orifices 17 to a variable extent dependent upon the deformation or change in shape of the ball. The result is that the device exerts a regulating or control effect on the flow of fluid whereby to maintain a constant or relatively constant rate of flow. FIGURE 7 illustrates the effect of the deformed ball. This is done automatically without other parts other than the orifice member 15 and ball 25. As will be observed, the device is extremely simple, being made of very simple parts which are easy to fabricate and install in the manner described. The device has a number of distinct advantages. Among these are that it has the characteristics of offering great design flexibility. The ratios of the diameters of the ball and the orifice member can be selected to produce various different kinds of characteristics. Also, the physical properties of the deformable member or ball 25 can be selected as to strength, hardness, etc., to thereby realize any desired characteristics in the device as a whole. The size, shape, location and number of the orifices can be varied and in this way the designer has a wide choice to select from in arriving at the ultimate characteristics desired.

Figure 2:
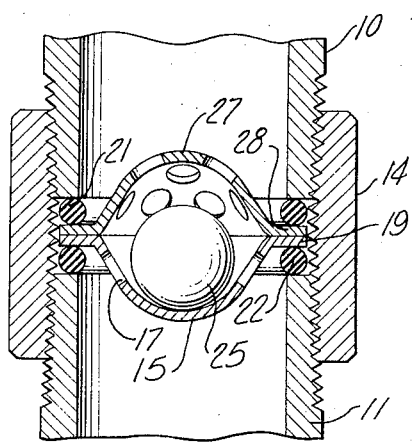
FIGURE 2 is a sectional view similar to that of FIGURE 1 showing a modified form of the invention.

FIGURE 2 shows a modified form of the invention in which a second orifice member 27 is provided having a peripheral flange 28 which is abutted against the flange 19 between the O-rings 21 and 22 as shown. In this device a generally spherical cage is formed for the ball 25. This device is therefore one that provides for flow regulation or control in both directions. The control action is similar to that of FIGURES 1 and 7.

Figure 3:
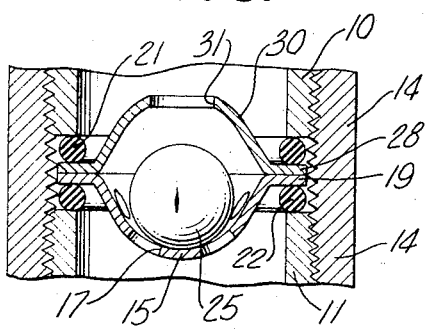
FIGURE 3 is a sectional view similar to that of FIGURES 1 and 2 showing a further modified form of the invention.
Figure 4:
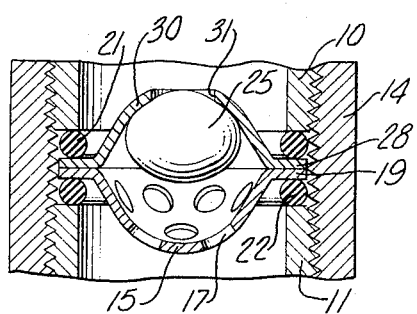
FIGURE 4 is a sectional view like that of FIGURE 3 showing the deformable ball member in deformed condition.
Figure 6:
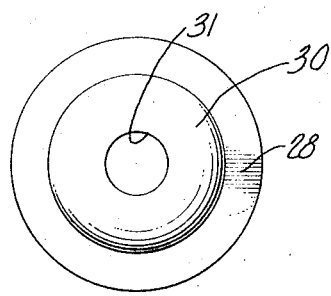
FIGURE 6 is a plan view of the top orifice member shown in FIGURES 3 and 4.
Figure 5:
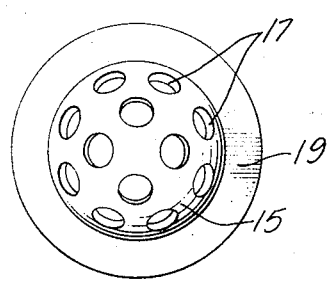
FIGURE 5 is a bottom view of the form of orifice member shown in FIGURE 3.

FIGURE 3 shows a modified form of the device having an upper orifice member 30 having a single central orifice 31 in it. This device acts as a flow control device in one direction and as a check valve in the opposite direction. FIGURE 4 shows this device acting as a check valve. As shown in FIGURE 4, the ball 25 is deformed by the fluid pressure in a manner to completely close off the orifice 31. In this way the device acts as a regulator or flow control device in one direction and a check valve in the opposite direction.

Figure 8:
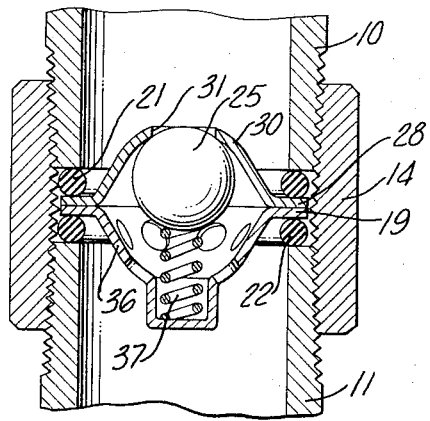
FIGURE 8 is a cross sectional view of a modified form of the invention.

FIGURE 8 shows a modified form of the invention wherein parts corresponding to parts of previous embodiments are similarly numbered. The lower orifice member 35 has an extending cylindrical cup 36 in which is seated a coil spring 37 that biases ball 25 towards opening 31 in orifice member 30. Ball 25 can still be urged down to close off orifices in orifice member 36 but against the force of spring 37 which therefore controls the regulating effect of the device as a valve. Ball 25 acts as a spring check valve in the upward direction.

From the foregoing, those skilled in the art will observe that the invention achieves and realizes all of the objects and advantagees as outlined in the foregoing as well as having many additional advantages which are apparent from the detailed description. This is particularly true as will be observed from the standpoint of simplicity, and versatility from the standpoint of design, application and usage.

The foregoing disclosure is representative of preferred forms of the invention and it is to be interpreted in an illustrative rather than a limiting sense, the invention to be accorded the full scope of the claims appended hereto.

I claim:

1. A flow control device for use in passageway comprising a member having orifice means through it, the said member having at least a part which is a surface of spherical configuration, a deformable generally spherical ball member positioned adjacent to the orifice means, the diameter of the ball being less than that of the spherical surface of the orifice member, the surface of the orifice member being unobstructed so that the ball engages the said surface in tangential relationship, the deformable member being deformable in response to fluid pressure so as to regulate the orifice area of the orifice member whereby to exercise control of the flow of fluid through the device as the deformable member deforms.

2. A device as in claim 1 wherein the orifice means is of a generally hemispherical configuration.

3. A device as in claim 1 wherein the orifice means has a circular peripheral flange and means for holding and sealing said flange within the tubular passageway.

4. A device as in claim 1 wherein said orifice means has a plurality of separate orifices therethrough spaced from the central axis of the orifice member.

5. A device as in claim 1 wherein said orifice means comprises a perforated cage enclosing the deformable member.

6. A device as in claim 5 wherein said cage has a single central orifice on one side so that the device operates as a check valve in one direction.

7. A device as in claim 1 including a spring positioned to urge the said deformable member in one direction to exert a regulating effect on flow control in that direction.

8. A device as in claim 1 wherein the said orifice means is configurated to hold a spring, and a spring held by the orifice means and acting on the deformable member to control the regulating effect.

9. A device as in claim 1 including a second means cooperating with the orifice means providing a cage for the deformable member, the orifice means and the second means having peripheral flanges and means sealing said flanges in the passageway being controlled.

References Cited

UNITED STATES PATENTS

| | | | |
|---|---|---|---|
| 692,761 | 2/1902 | Bickel | 137—533.13 |
| 1,211,283 | 1/1917 | Butler | 137—533.13 |
| 2,223,944 | 12/1940 | Roy | 137—525 |
| 2,236,477 | 3/1941 | Fuchs | 137—525 |
| 2,424,108 | 6/1947 | Merten | 137—533.13 |
| 3,002,460 | 10/1961 | Ward | 137—525 |

FOREIGN PATENTS 575,394  5/1959  Canada.

WILLIAM F. O'DEA, *Primary Examiner.*

W. H. WRIGHT, *Assistant Examiner.*